US009207918B2

(12) United States Patent
Tsai et al.

(10) Patent No.: US 9,207,918 B2
(45) Date of Patent: *Dec. 8, 2015

(54) FIRMWARE EXTENSION METHOD AND FIRMWARE BUILDER

(71) Applicant: MediaTek Inc., Hsin-Chu (TW)

(72) Inventors: Chien-Liang Tsai, Taipei County (TW); Wei-Guan Yau, Hsin-Chu (TW); Chung-Yen Tsai, Bade (TW)

(73) Assignee: MEDIATEK INC., Hsin-Chu (TW)

( * ) Notice: Subject to any disclaimer, the term of this patent is extended or adjusted under 35 U.S.C. 154(b) by 95 days.

This patent is subject to a terminal disclaimer.

(21) Appl. No.: 13/755,385

(22) Filed: Jan. 31, 2013

(65) Prior Publication Data

US 2013/0145353 A1 Jun. 6, 2013

Related U.S. Application Data

(63) Continuation of application No. 12/352,692, filed on Jan. 13, 2009, now Pat. No. 8,392,895.

(51) Int. Cl.
*G06F 9/44* (2006.01)
*G06F 9/45* (2006.01)
*G06F 9/445* (2006.01)
*G06F 9/30* (2006.01)

(52) U.S. Cl.
CPC .. *G06F 8/41* (2013.01); *G06F 8/54* (2013.01); *G06F 9/4426* (2013.01); *G06F 9/30138* (2013.01)

(58) Field of Classification Search
CPC ............. G06F 8/41; G06F 8/443; G06F 8/71; G06F 8/54; G06F 9/4426; G06F 9/30138
See application file for complete search history.

(56) References Cited

U.S. PATENT DOCUMENTS

| 6,219,834 | B1 * | 4/2001 | Soroker et al. ................. 717/145 |
| 6,954,923 | B1 * | 10/2005 | Yates et al. ..................... 717/130 |
| 7,007,159 | B2 | 2/2006 | Wyatt |
| 7,260,848 | B2 | 8/2007 | Zimmer |

(Continued)

FOREIGN PATENT DOCUMENTS

CN 1904853 1/2007

OTHER PUBLICATIONS

Feng Zhou, SafeDrive: Safe and Recoverable Extensions Using Language-Based Techniques, 2006, pp. 1-18.*

(Continued)

*Primary Examiner* — Thuy Dao
*Assistant Examiner* — Mongbao Nguyen
(74) *Attorney, Agent, or Firm* — McClure, Qualey & Rodack, LLP

(57) ABSTRACT

A firmware extension method is provided, particularly adaptable for an embedded system. Firstly, a baseline firmware image is provided with a header file. Secondly, an extension firmware image is generated based on the header file, comprising one or more extended functions. Thereafter, a callback table is generated, comprising pointers pointing to entries of the extended functions in the extension firmware image. Further, memory allocation parameters are provided. The memory allocation parameters comprise a base address where the extension firmware image starts. The baseline firmware image, the extension firmware image and the callback table are then merged to generate a merged firmware image based on the memory allocation parameters.

15 Claims, 7 Drawing Sheets

(56) References Cited

U.S. PATENT DOCUMENTS

| | | | |
|---|---|---|---|
| 7,533,368 B1* | 5/2009 | Ford | 717/113 |
| 7,676,800 B2 | 3/2010 | Kinney | |
| 7,694,291 B2 | 4/2010 | Chen et al. | |
| 7,809,918 B1* | 10/2010 | Samuel | 711/171 |
| 8,271,964 B2 | 9/2012 | Zorn et al. | |
| 2002/0062400 A1* | 5/2002 | Holze et al. | 709/310 |
| 2003/0135848 A1* | 7/2003 | Krishnan | 717/158 |
| 2004/0015941 A1 | 1/2004 | Sekine | |
| 2004/0030768 A1 | 2/2004 | Krishnamoorthy et al. | |
| 2005/0010902 A1* | 1/2005 | Takacsi-Nagy et al. | 717/114 |
| 2005/0022161 A1* | 1/2005 | Burger et al. | 717/108 |
| 2005/0027971 A1* | 2/2005 | Williams et al. | 712/227 |
| 2005/0097523 A1* | 5/2005 | Uchida | 717/136 |
| 2005/0138610 A1* | 6/2005 | Terunuma | 717/140 |
| 2005/0246693 A1* | 11/2005 | Plum | 717/140 |
| 2005/0251583 A1 | 11/2005 | Rothman et al. | |
| 2006/0020936 A1 | 1/2006 | Wyatt | |
| 2006/0184924 A1 | 8/2006 | Hsieh | |
| 2007/0079283 A1* | 4/2007 | Kuninobu et al. | 717/106 |
| 2007/0271080 A1 | 11/2007 | Tatsuoka et al. | |
| 2007/0300150 A1 | 12/2007 | Davis | |
| 2008/0052699 A1 | 2/2008 | Baker et al. | |
| 2008/0072211 A1 | 3/2008 | Rothman et al. | |
| 2008/0127066 A1* | 5/2008 | Kang Min et al. | 717/114 |
| 2008/0127136 A1 | 5/2008 | Hino et al. | |
| 2009/0064124 A1 | 3/2009 | Chung | |
| 2009/0126017 A1* | 5/2009 | Chahal | 726/23 |
| 2009/0144711 A1* | 6/2009 | Chang | 717/151 |
| 2009/0282399 A1 | 11/2009 | Kamrowski | |
| 2010/0077387 A1 | 3/2010 | Callaghan et al. | |

OTHER PUBLICATIONS

Maxim Grabarnik, Dynamic Offloading Infrastructure for Programmable Devices, 2007, pp. 24-34.*

Alexey Smirnov, A User-Level Development Environment for In-Kernel Network Protocol/Extension Implementations, 2005, pp. 2-10.*

Chinese language office action dated May 4, 2012.

Mukesh Agrawal, Simplifying Distributed Application Upgrades with Simultaneous Execution, 2005, pp. 7-10.

Sun Microsystems, Sun Storage Tek Common Array Manager Software Release Notes, 2008, pp. 26-29.

Microsoft Corporation, Microsoft Portable Executable and Common Object File Format Specification, 1999, pp. 10-32.

* cited by examiner

FIRMWARE EXTENSION METHOD AND FIRMWARE BUILDER

CROSS REFERENCE TO RELATED APPLICATION

The present application is a Continuation Application of U.S patent application Ser. No. 12/352,692, filed on Jan. 13, 2009, now U.S. Pat. No. 8,392,895, which is incorporated by reference herein.

BACKGROUND OF THE INVENTION

1. Field of the Invention

The invention relates to firmware extensions, and in particular, to a method for adding user customized functionalities into a baseline firmware image without compromising baseline firmware source codes.

2. Description of the Related Art

Firmware extension is generally required in a manufacture line of a product, especially between upstream suppliers and downstream vendors. An upstream supplier usually provides hardware bundled with a baseline firmware image, and when various additional applications are required to deploy on a single embedded system, a baseline firmware image can only provide basic functions that are incapable of performing the variable functionalities. Thus, the downstream vendor may need to further modify the baseline firmware image to provide additional features before selling the product. Conventionally, source codes are required to modify functionalities of the baseline firmware image, and release of the source codes is usually very undesirable for the upstream suppliers because confidential information involved with the hardware design may be compromised.

FIG. 1 is a flowchart of conventional firmware modification. In step 101, source codes of the baseline firmware image are released from the upstream supplier, probably including header files, libraries and object files. In step 103, the downstream vendor modifies the source code to implement extended functionalities for the hardware. In step 105, a modified firmware image is compiled from the modified source codes, whereby the original firmware image is replaced. Since the source codes, the libraries and object files contain confidential information undesirable to be compromised, there is a need for an advanced firmware extension method.

BRIEF SUMMARY OF THE INVENTION

An exemplary embodiment of a firmware extension method is provided, particularly adaptable for an embedded system. Firstly, a baseline firmware image is provided with a header file. Secondly, an extension firmware image is generated based on the header file, comprising one or more extended functions. Thereafter, a callback table is generated, comprising pointers pointing to entries of the extended functions in the extension firmware image. The baseline firmware image, the extension firmware image and the callback table are then merged to generate a merged firmware image.

Furthermore, memory allocation parameters may also be provided, comprising a base address where the extension firmware image starts. The step of merging is therefore performed based on the memory allocation parameters.

The baseline firmware image may comprise an extension pointer for storing the entry of the callback table. The callback table comprises an enablement flag indicating whether the extended functions are enabled, and the baseline firmware image is programmed to conditionally load and execute the extended functions through the callback table based on the extension pointer and enablement flag.

The baseline firmware image may comprise a plurality of Application Program Interface (API) functions, and the header file declares the API functions whereby the API functions are usable by the extended functions.

To generate the extension firmware image, source codes of the extended functions and a symbol table are provided. The symbol table comprises pointers pointing to entries of the API functions. The source codes are then compiled with the header file and the symbol table to generate the extension firmware image.

In an alternative embodiment, a firmware builder is provided to implement the firmware extension method. The firmware builder comprises a compiler and a building module. The compiler compiles source codes of one or more extended functions into an extension firmware image based on a header file associated with the baseline firmware image. The building module merges the extension firmware image with the baseline firmware image to generate a merged firmware image. Specifically, the building module generates a callback table comprising pointers pointing to entries of the extended functions in the extension firmware image, whereby the building module merges the baseline firmware image, the extension firmware image and the callback table to generate the merged firmware image.

In a further embodiment, the callback table is generated by the compiler instead of the building module. The building module simply merges the extension firmware image, the baseline firmware image and the callback table to generate a merged firmware image. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2b shows embodiments of a baseline firmware image and a symbol table based on FIG. 2a;

FIG. 2c shows embodiments of an extension firmware image and a callback table based on FIG. 2a;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
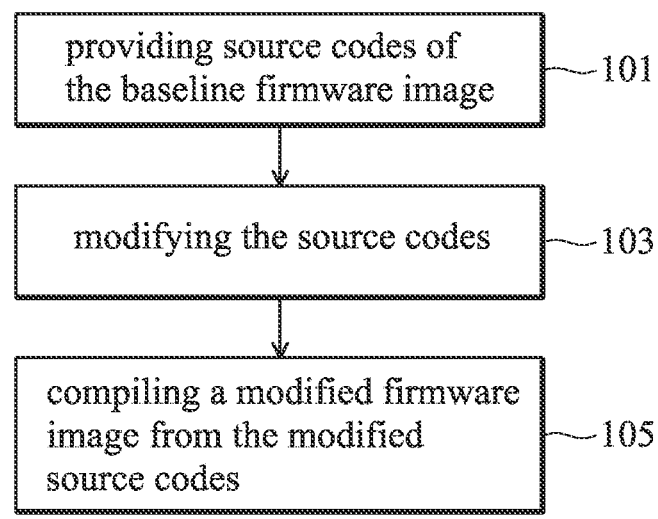
FIG. 1 is a flowchart of conventional firmware modification.
Figure 2A:
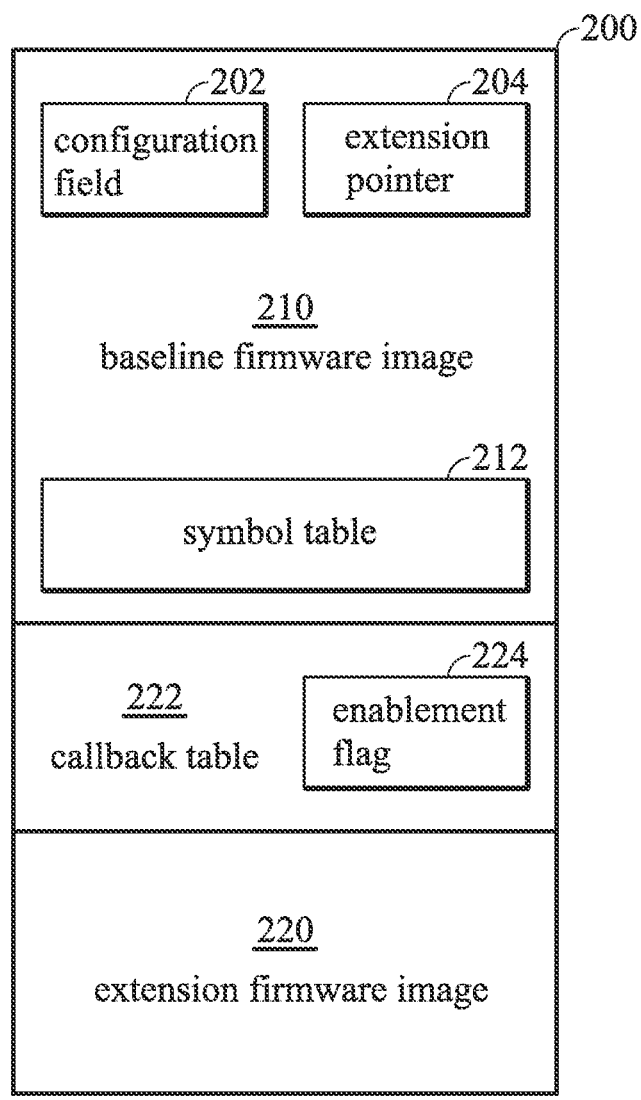
FIG. 2a shows an embodiment of a merged firmware image.

FIG. 2a shows an embodiment of a merged firmware image. The merged firmware image 200 comprises a baseline firmware image 210 and an extension firmware image 220 linked with a callback table 222. The baseline firmware image 210 is provided by the upstream supplier, which stays uncompromised while merging with the extension firmware image 220. The uncompromised status means, by means of various known code protection techniques, the baseline firmware image 210 can be made executable but is difficult to be decompiled by reverse engineering. Meanwhile, the extension firmware image 220 is generated based on an open standard, allowing the downstream supplier to implement additional functions. Originally, the baseline firmware image 210 is stored in a memory device of an embedded system (not shown), and the capacity of the memory device is limited. The extension firmware image 220 and callback table 222 may be stored in free spaces of the memory device while the baseline firmware image 210 remains at the same place. To specify how much capacity is available in the memory device, the upstream supplier may provide a configuration field 202 recording memory allocation parameters such as the size of the free space, and a base address where the extension firmware image 220 should be allocated. In the embodiment, the baseline firmware image 210 is programmed to periodically or conditionally branch to the callback table 222 according to an extension pointer 204, such that extended functions in the extension firmware image 220 can be loaded and executed. Specifically, the entry address of the callback table 222 may be an absolute address on the memory device, obtained and written to the extension pointer 204 when merging the extension firmware image 220 and callback table 222.

Figure 2B:
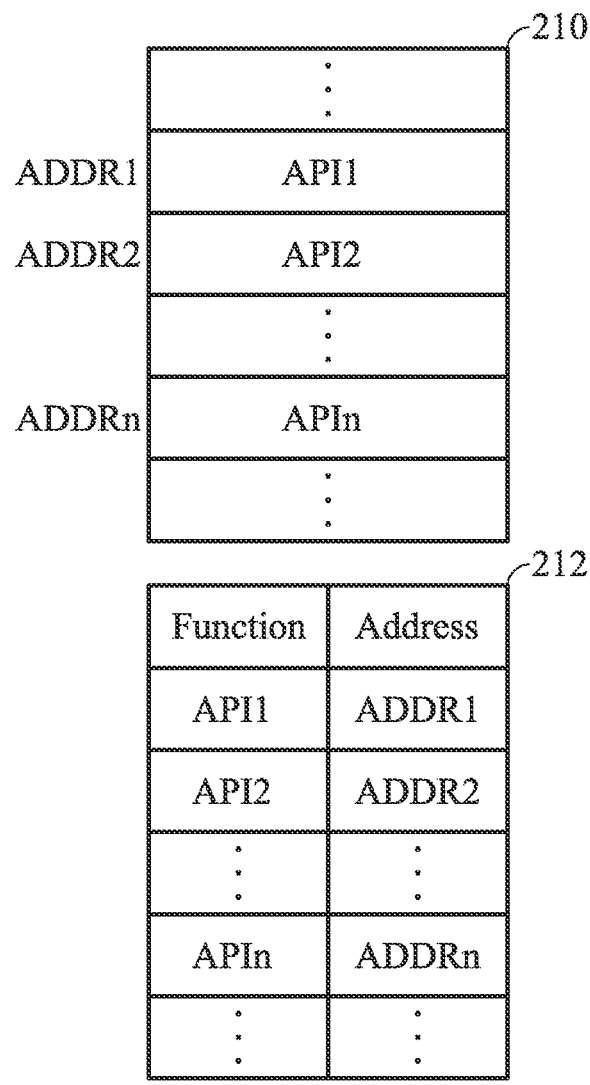

FIG. 2b shows embodiments of a baseline firmware image 210 and a symbol table 212 based on FIG. 2a. The baseline firmware image 210 may comprise a plurality of fundamental Application Program Interface (API) functions that are required by the extension firmware image 220. The API functions can be hardware abstraction layer functions such as I/O, DMA, codec, DSP and other hardware drivers, and can also be software libraries such as standard C/C++, math, science and engineering sub-routines. As shown in FIG. 2b, the API functions API1, API2, . . . , APIn are respectively stored in absolute addresses ADDR1, ADDR2, . . . , ADDRn. To share the API functions, the upstream supplier may provide a symbol table 212 indicating the entry addresses of the API functions and a header file header file #H declaring definitions of the API functions. In this way, the API functions can be referred to by the extended functions at compile time and runtime.

Figure 2C:
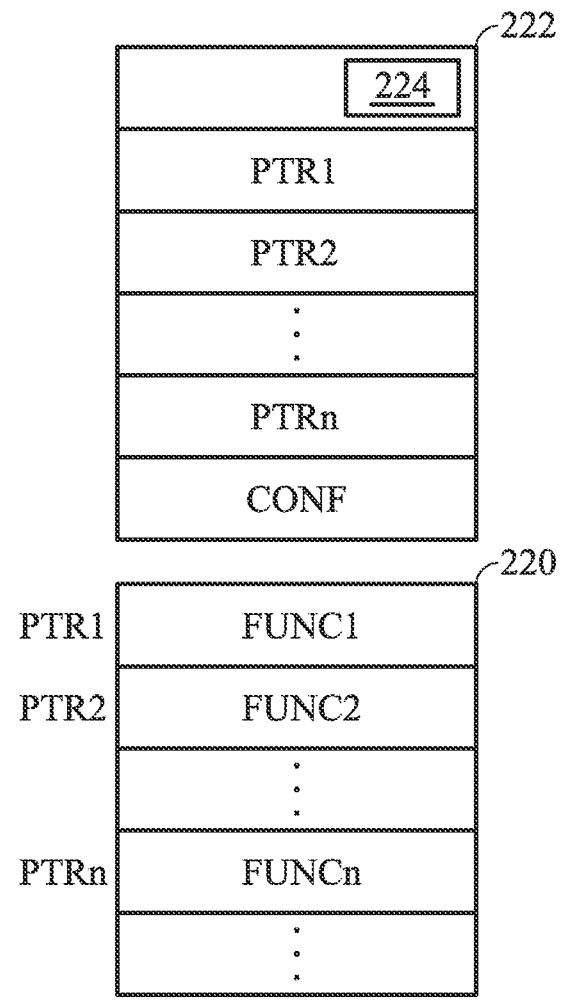

FIG. 2c shows embodiments of an extension firmware image 220 and a callback table 222 based on FIG. 2a. The extension firmware image 220 is provided by the downstream vendor, typically comprising one or more extended functions FUNC1, FUNC2, . . . , FUNCn. When the extension firmware image 220 is compiled from downstream vendor source codes, each function has a relative entry address PTR1, PTR2, . . . , PTRn. The callback table 222 is established to store the entry addresses, whereby the extended functions can be loaded and executed when a corresponding interruption is initiated. Furthermore, the callback table 222 may comprise an enablement flag 224, defining whether the extended functions are enabled. If the baseline firmware image 210 is executed to read the enablement flag 224, wherein the extended functions are flagged as disabled, the functions in the extension firmware image 220 would not be loaded and executed. The callback table 222 may further comprise a reserved space for storage of user customized configurations related to the extended functions.

Figure 3A:
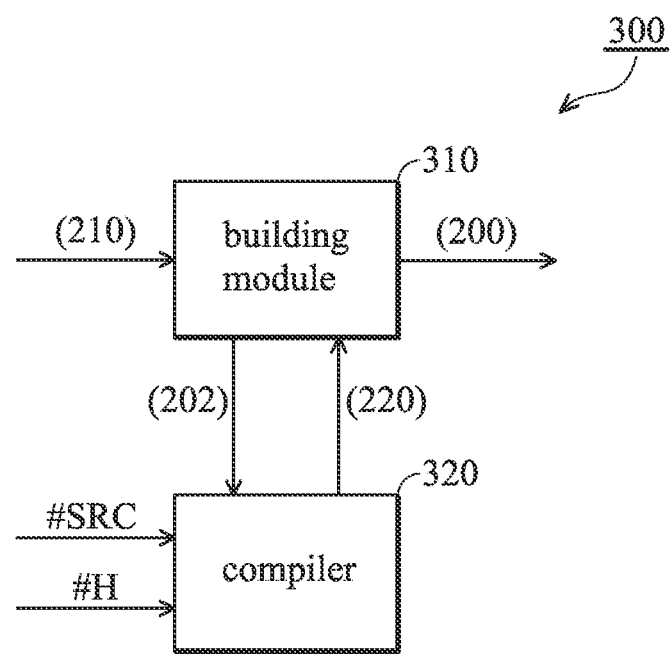
FIG. 3a shows an embodiment of a firmware builder.

FIG. 3a shows an embodiment of a firmware builder 300, by which the merged firmware image 200 in FIG. 2a is generated from a baseline firmware image 210, source codes #SRC and a header file #H. The firmware builder 300 comprises a building module 310 and a compiler 320. The compiler 320 compiles the source codes #SRC based on the header file #H associated with the baseline firmware image 210. During compile time, the information within the configuration field 202 and symbol table 212 are also used. When the extension firmware image 220 is obtained, the callback table 222 as shown in FIG. 2c is generated from the extension firmware image 220, comprising pointers pointing to entries of the extended functions in the extension firmware image 220. The callback table 222 may be generated by the building module 310 simultaneously when merging the extension firmware image 220 and the baseline firmware image 210. Alternatively, since the callback table 222 contains information related to the extension firmware image, the callback table 222 can also be generated by the compiler 320 when the extension firmware image 220 is compiled. As the callback table 222 is generated, the building module 310 then merges the callback table 222 with the baseline firmware image 210 and extension firmware image 220 to generate the merged firmware image 200.

As described, a configuration field 202 may be provided with the baseline firmware image 210, comprising memory allocation parameters such as available capacity for storage of the extension firmware image, and a base address where the extension firmware image starts. The memory allocation parameters are required so the compiler 320 can control the extension firmware image 220 size and correctly derive entry addresses of each function in the extension firmware image 220. The extension pointer 204 is a preserved area for storage of the entry of the callback table 222, and the enablement flag 224 in the callback table 222 defines whether the extended functions are enabled. The baseline firmware image 210 may periodically or conditionally trigger a sub-function call to check the enablement flag 224 via the extension pointer 204. For example, a timer may be configured, so that the extended functions are executed periodically. Certain events or interruptions may also be defined to trigger the sub-function call, and if the extended functions are enabled by the enablement flag 224, they are loaded and executed.

The baseline firmware image 210 may comprise a plurality of Application Program Interface (API) functions, and the header file #H is used as a reference to declare the API functions. A symbol table 212 is provided by the upstream supplier, comprising pointers pointing to entries of the API functions. The symbol table 212 may be part of the baseline firmware image 210, or an independent file as well as the header file #H. The downstream vendor may include the header file #H when producing the source codes #SRC, and the compiler 320 then compiles the source codes #SRC with the header file #H and the symbol table 212 to generate the extension firmware image 220 so that the API functions are usable by the extended functions. Basically, the firmware builder 300 may be a software module employed in the manufacturing stage of a product. As will be appreciated by person skilled in the art, the proposed firmware builder 300 can be stored in a non-transitory computer readable medium.

Figure 3B:
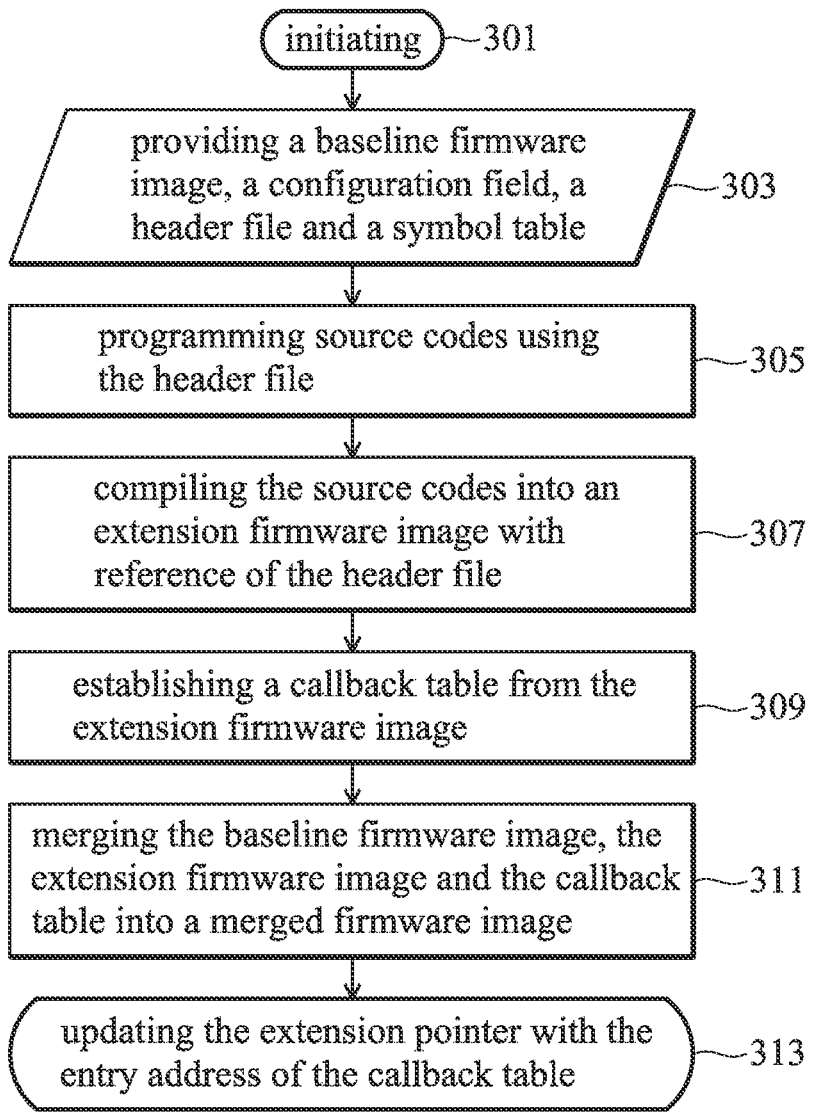
FIG. 3b is a flowchart of a firmware extension method according to the invention.

FIG. 3b is a flowchart of a firmware extension method according to the invention. The firmware extension method is particularly used when a downstream vendor intends to add new features into the original baseline firmware image, and the method does not require any source code from the upstream supplier. In step 301, the downstream vendor initiates the firmware extension process. In step 303, a baseline firmware image 210 is acquired from the upstream supplier, with a predefined configuration field 202, a header file #H and a symbol table 212. An extension pointer 204 is preserved for storage of a value, which is determined later on. In step 305, the downstream vendor produces source codes #SRC of one or more extended functions using the header file #H. In step 307, the source codes #SRC is compiled into an extension firmware image 220 with the header file #H reference. In step 309, a callback table 222 is established from the extension firmware image 220, comprising entry addresses of each extended functions. In step 311, the baseline firmware image 210, extension firmware image 220 and callback table 222 are merged into a merged firmware image 200. The merged firmware image 200 may be stored at the same memory device where the baseline firmware image 210 is provided, whereby the baseline firmware image 210 is replaced. In step 313, the extension pointer 204 is the baseline firmware image 210 and is updated with the entry address of the callback table 222, such that the callback table 222 can be referred to, to load the extended functions in the extension firmware image 220 when a sub-function call in the baseline firmware image 210 is conditionally triggered.

Figure 4:
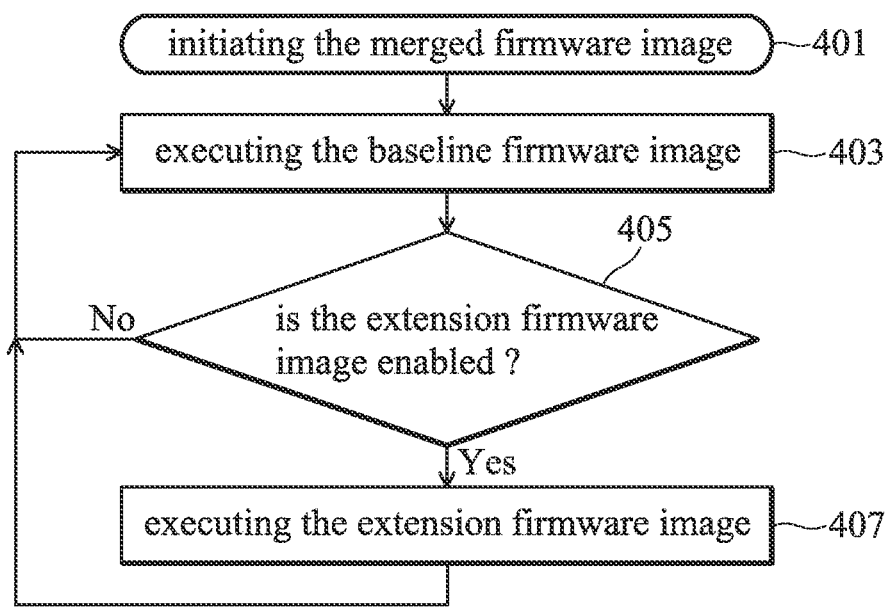
FIG. 4 is a flowchart of an embodiment of using the merged firmware.

FIG. 4 is a flowchart of an embodiment of using the merged firmware. Since the bodies of extended functions in extension firmware image 220 are not previously defined in the baseline firmware image 210, a mechanism is required to trigger the extended functions. In step 401, an embedded system employing the merged firmware image 200 is initiated. In step 403, the baseline firmware image 210 is executed. Note that a sub-function call was previously implemented in the baseline firmware image 210 to support firmware extension. In step 405, the sub-function call in the baseline firmware image 210 is periodically or conditionally executed to determine whether the extension firmware image 220 is enabled according to the value stored in the enablement flag 224. For example, the sub-function call may be triggered by specific events or interruptions. If the extension firmware image 220 is not enabled, the sub-function call returns null, and the process returns to step 403. Otherwise, if the extension firmware image 220 is enabled, the callback table 222 is referred by the sub-function call to load and execute corresponding extended functions from the extension firmware image 220 in step 407. When the executions of extended functions are complete, the process returns to step 403. Generally, the extension firmware image 220 shares the same stack memory as with the baseline firmware image 210. The merged firmware image 200 may be directly read from a memory device and executed by a processor, or loaded into a memory device before execution. There may be some global variables simultaneously sharable by the baseline firmware image 210 and extension firmware image 220, and these global variables can be stored with the API functions in the symbol table 212.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A firmware extension method executed by a processor inan embedded system, comprising:
    providing a baseline firmware image and a header file associated with the baseline firmware image;
    generating an extension firmware image based on the header file, comprising one or more extended functions;
    generating a callback table comprising pointers pointing to entries of the extended functions in the extension firmware image; and
    providing memory allocation parameters comprising a base address where the extension firmware image starts; and
    merging the baseline firmware image, the extension firmware image and the callback table to generate a merged firmware image based on the memory allocation parameters.

2. The firmware extension method as claimed in claim 1, wherein the step of merging comprises storing the entry of the callback table into an extension pointer.

3. The firmware extension method as claimed in claim 2, wherein:
    the callback table comprises an enablement flag indicating whether the extended functions are enabled; and
    the baseline firmware image is programmed to conditionally load and execute the extended functions through the callback table based on the extension pointer and the enablement flag.

4. The firmware extension method as claimed in claim 1, wherein:
    the baseline firmware image comprises a plurality of Application Program Interface (API) functions; and
    the header file declares the API functions whereby the API functions are usable by the extended functions.

5. The firmware extension method as claimed in claim 4, wherein generation of the extension firmware image comprises:
    providing source codes of the extended functions;
    providing a symbol table comprising pointers pointing to entries of the API functions; and
    compiling the source codes with the header file and the symbol table to generate the extension firmware image.

6. A firmware builder stored in a non-transitory computer readable medium, for extending functionality of a baseline firmware image use in an embedded system, comprising:
    a compiler, compiling source codes of one or more extended functions into an extension firmware image based on a header file associated with the baseline firmware image; and
    a building module, generating a callback table comprising pointers pointing to entries of the extended functions in the extension firmware image, the baseline firmware image comprises memory allocation parameters comprising a base address where the extension firmware image starts, and merging the extension firmware image, the baseline firmware image and the callback table to generate a merged firmware image based on the memory allocation parameters.

7. The firmware builder as claimed in claim 6, wherein:
    the baseline firmware image comprises a extension pointer; and
    the building module stores the entry of the callback table into the extension pointer.

8. The firmware builder as claimed in claim 7, wherein:
    the callback table comprises an enablement flag indicating whether the extended functions are enabled; and
    the baseline firmware image is programmed to conditionally load and execute the extended functions through the callback table based on the extension pointer and the enablement flag.

9. The firmware builder as claimed in claim 6, wherein:
    the baseline firmware image comprises a plurality of Application Program Interface (API) functions; and
    the header file declares the API functions whereby the API functions are usable by the extended functions.

10. The firmware builder as claimed in claim 9, wherein:
the compiler compiles the source codes with the header file and a symbol table to generate the extension firmware image; and
the symbol table comprises pointers pointing to entries of the API functions.

11. A firmware builder stored in a non-transitory computer readable medium, for extending functionality of a baseline firmware image use in an embedded system, comprising:
a compiler, compiling source codes of one or more extended functions into an extension firmware image based on a header file associated with the baseline firmware image; and
a building module, generating a callback table comprising pointers pointing to entries of the extended functions in the extension firmware image, the baseline firmware image comprises memory allocation parameters comprising a base address where the extension firmware image starts, and merging the extension firmware image, the baseline firmware image and the callback table to generate a merged firmware image based on the memory allocation parameters.

12. The firmware builder as claimed in claim 11, wherein:
the baseline firmware image comprises a extension pointer; and
the building module stores the entry of the callback table into the extension pointer.

13. The firmware builder as claimed in claim 12, wherein:
the callback table comprises an enablement flag indicating whether the extended functions are enabled; and
the baseline firmware image is programmed to conditionally load and execute the extended functions through the callback table based on the extension pointer and the enablement flag.

14. The firmware builder as claimed in claim 11, wherein:
the baseline firmware image comprises a plurality of Application Program Interface (API) functions; and
the header file declares the API functions whereby the API functions are usable by the extended functions.

15. The firmware builder as claimed in claim 14, wherein:
the compiler compiles the source codes with the header file and a symbol table to generate the extension firmware image; and
the symbol table comprises pointers pointing to entries of the API functions.

\* \* \* \* \*